United States Patent [19]

Carmichael

[11] 4,385,908
[45] May 31, 1983

[54] HIGH PRESSURE CONDENSATE RETURN APPARATUS AND METHOD AND SYSTEM FOR USING THE SAME

[75] Inventor: Floyd W. Carmichael, Greensboro, N.C.

[73] Assignee: Air Conditioning Corporation, Greensboro, N.C.

[21] Appl. No.: 319,057

[22] Filed: Nov. 6, 1981

[51] Int. Cl.³ .......................................... B01D 19/00
[52] U.S. Cl. ........................................ 55/39; 55/41;
55/48; 55/164; 55/186; 55/193; 122/488;
122/489
[58] Field of Search ................. 55/39, 41, 48, 55, 164,
55/185–188, 192, 193; 122/406, 457, 488, 489

[56] References Cited

U.S. PATENT DOCUMENTS

| | | | |
|---|---|---|---|
| 1,552,071 | 9/1925 | McDermet | 55/164 |
| 1,611,256 | 12/1926 | Suczek | 55/39 |
| 1,758,566 | 5/1930 | Elliott | 55/39 X |
| 1,806,371 | 5/1931 | Spyer | 55/39 X |
| 1,809,411 | 6/1931 | Elliott | 55/41 |
| 2,671,524 | 3/1954 | Gilwood | 55/39 |
| 2,677,433 | 5/1954 | Kretzschmar | 55/39 X |
| 3,210,912 | 10/1965 | Peake et al. | 55/39 |
| 3,338,033 | 8/1967 | Ross | 55/39 X |
| 3,342,020 | 9/1967 | Ross | 55/39 X |
| 3,347,023 | 10/1967 | Scott | 55/39 X |
| 3,418,214 | 12/1968 | Cane | 55/39 X |
| 3,834,133 | 9/1974 | Bow | 55/39 X |

OTHER PUBLICATIONS

Brochure: Industrial Steam, Div. of Kewanee Boiler Corp., "Zero Flash Closed Loop Condensate System", Apr., 1981.
Brochure: Crane Cochrane Environmental Systems, "The Cochrane Condensate Booster Drainage Control System".
Marks' Mechanical Engineers' Handbook, 7th Ed., pp. 9-101 to 9-102.

*Primary Examiner*—Robert H. Spitzer
*Attorney, Agent, or Firm*—Lane, Aitken & Kananen

[57] ABSTRACT

An improvement in a high pressure condensate return unit and a method of using such a unit are disclosed. In a high pressure condensate return vessel of the type which includes a receiver portion and a deaeration portion for separating non-condensible gases from the steam condensate for venting from the vessel, the improvement includes a throttle valve responsive to the level of condensate within the vessel for controlling the amount of condensate returned directly to a steam boiler or recirculated to the interior of the unit. When fully open, the throttle valve substantially causes all of the condensate pumped from the outlet of the vessel to be returned to the vessel for deaeration, whereas when the throttle valve is fully closed, all of the condensate is provided directly to the boiler.

21 Claims, 5 Drawing Figures

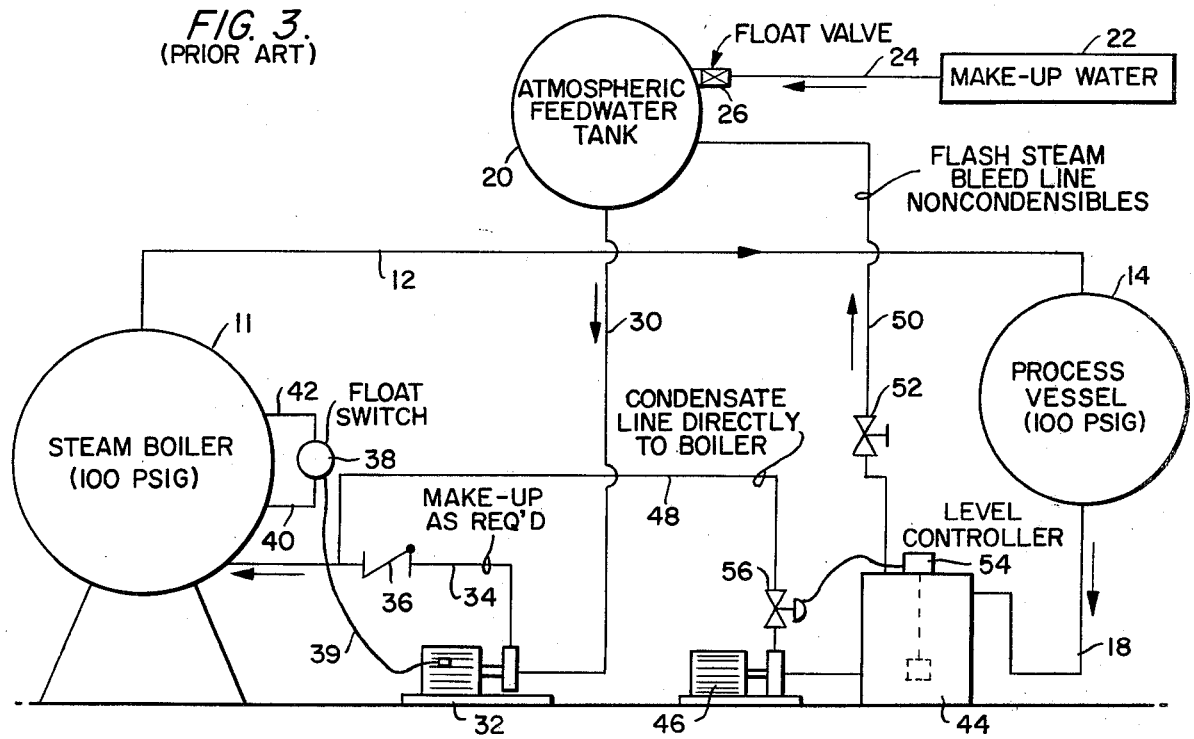
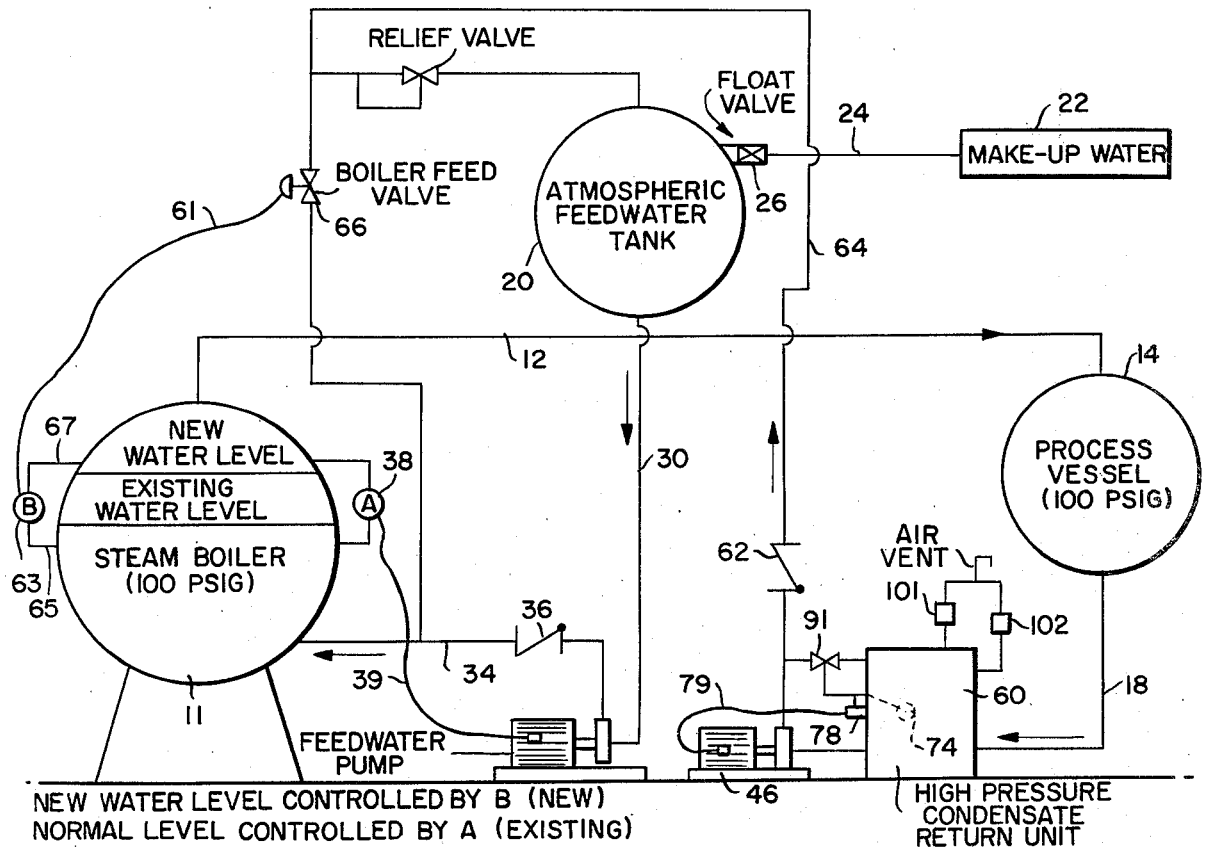

HIGH PRESSURE CONDENSATE RETURN APPARATUS AND METHOD AND SYSTEM FOR USING THE SAME

BACKGROUND OF THE INVENTION

This invention relates to a high pressure condensate return unit for use in high pressure condensate return systems in steam systems. More particularly, this invention relates to such an apparatus for returning condensate from high pressure steam systems directly to a boiler in a way in which the release of vapors is eliminated and without a throttling of the pump suction or discharge while maintaining adequate provision for deaeration without external condensate flow rate controls. Still more particularly, this invention relates to such a unit as described, a system for utilizing such a unit to return high pressure condensate directly to the boiler at a rate consistent with the condensate input to the apparatus, and to a method for using the same in a steam generating system.

It is an overall purpose of the invention disclosed and described herein to save energy. In steam generating systems of the prior art which involve the use of steam, wherein the steam is condensed at high pressure and temperature, the condensate from the process vessels is returned to the steam generating system. In the prior art, the predominantly known method for returning this condensate is through the use of mechanical steam traps to separate the condensate from the steam in the vessel, and utilizing steam pressure to force the condensate back to an atmospheric or lower pressure receiver. The receiver in such systems acts as a collection point, surge tank, feedwater make-up tank, and point of removal for air and other non-condensible gases from the condensate. The feedwater is thereafter pumped from the receiver back to the boiler using high pressure pumps which are automatically controlled.

It is a continuing problem in the use of such systems in that when the condensate is returned from the process to the receiver, a large amount of vapor is flashed through the receiver vent pipe as the condensate is cooled from the saturated steam temperature to its saturation temperature at the receiver pressure. Quite often, the condensate is cooled to 212° F. because the receiver is often at atmospheric pressure or in communication with the atmosphere. In order to maintain a relatively constant volume of feedwater in the system, the make-up water at ambient temperature, such as 60° F., is periodically added to the system to replace the volume of steam flashed to the atmosphere. This water plus the remaining condensate must therefore be reheated to the saturation temperature inside the boiler before steam can be regenerated. This results in significant energy losses resulting from the energy wasted due to the flashing of the condensate to the steam. In addition, losses are incurred in pumping costs since the condensate must be raised from a zero or low pressure back to the boiler pressure by the feedwater pumps.

Also in the prior art, such losses have been sought to be minimized or eliminated by the development of high pressure condensate return systems. However, with such systems there has typically been a need to depress the temperature or pressure of the condensate in order to pump the condensate or to throttle the pump discharge for the control causing undue wear of seals, impellers, and bearings of the requirement to cycle the pump. Such units have had only limited provisions for the removal of air and non-condensible gases consisting generally of simple bleed lines for flashing a small amount of condensate from a very low surface area. Moreover, the overall design of such systems has required an elaborate and expensive control system to assure pumping rates.

Thus, it is an overall aspect of this invention to provide a high pressure condensate return unit for high pressure systems designed to return the condensate directly to the boiler while bypassing the feedwater system in a way which eliminates the need to release vapors at any point in the system and without throttling the pump suction or discharge while yet providing adequate provisions for deaeration without the need for elaborate controls.

These and other overall objects of the invention will become apparent from a written description of the invention which follows.

BRIEF SUMMARY OF THE INVENTION

Directed to achieving the objects of the invention and overcoming the problems of the prior art, the invention relates to an improvement in a high pressure condensate return apparatus of the type which comprises a vessel having an inlet for receiving steam condensate at a high pressure and temperature and an outlet for the discharge of such condensate from the receiver portion in the vessel. The vessel includes means for deaerating the condensate to separate air and non-condensible gases from the apparatus to be vented to the exterior of the apparatus. The improvement includes means for recirculating a controlled amount of condensate to the interior of the vessel by using a throttling valve with a degree of opening which is responsive to the level of condensate sensed within the unit. Under such conditions, the condensate pump connected between the outlet of the vessel and the recirculating input to the vessel may be constantly operated in its normal speed without throttling. When the throttle valve is fully open, substantially all of the condensate pumped from the outlet of the vessel is returned to the inlet of the vessel for deaeration. Conversely, when the throttle valve is fully closed, substantially all of that condensate is returned directly to the steam boiler. Since the throttle valve is continuously modulated between its fully open and fully closed positions in response to the level of condensate within the vessel, the rate of return of the condensate to the boiler is automatically controlled without the need for elaborate external controls.

In a presently preferred embodiment, the sensor includes a float having a lever connected to a switch for actuating the pump at a predetermined low level of condensate and also to modulate the throttle valve as described. The method of using the invention in a high pressure steam system is also disclosed. Thus, the improvement provides an apparatus for returning high pressure steam condensate directly to a steam generating boiler while bypassing the feedwater system in such a way which avoids the release of vapors at any point in the system thereby conserving energy without throttling of the pump suction or discharge while maintaining adequate provisions for deaeration and eliminating the need for elaborate outside controls.

BRIEF DESCRIPTION OF THE DRAWINGS

In the drawings

FIG. 3 illustrates in block form a typical and conventional high pressure condensate return system which seeks to minimize or eliminate the energy losses due to flashing such as in the system shown in FIG. 1;

FIG. 4 is a block diagram of a system according to the invention which utilizes the high pressure condensate return apparatus according to the invention.

DETAILED DESCRIPTION OF THE PREFERRED EMBODIMENTS

Figure 1:
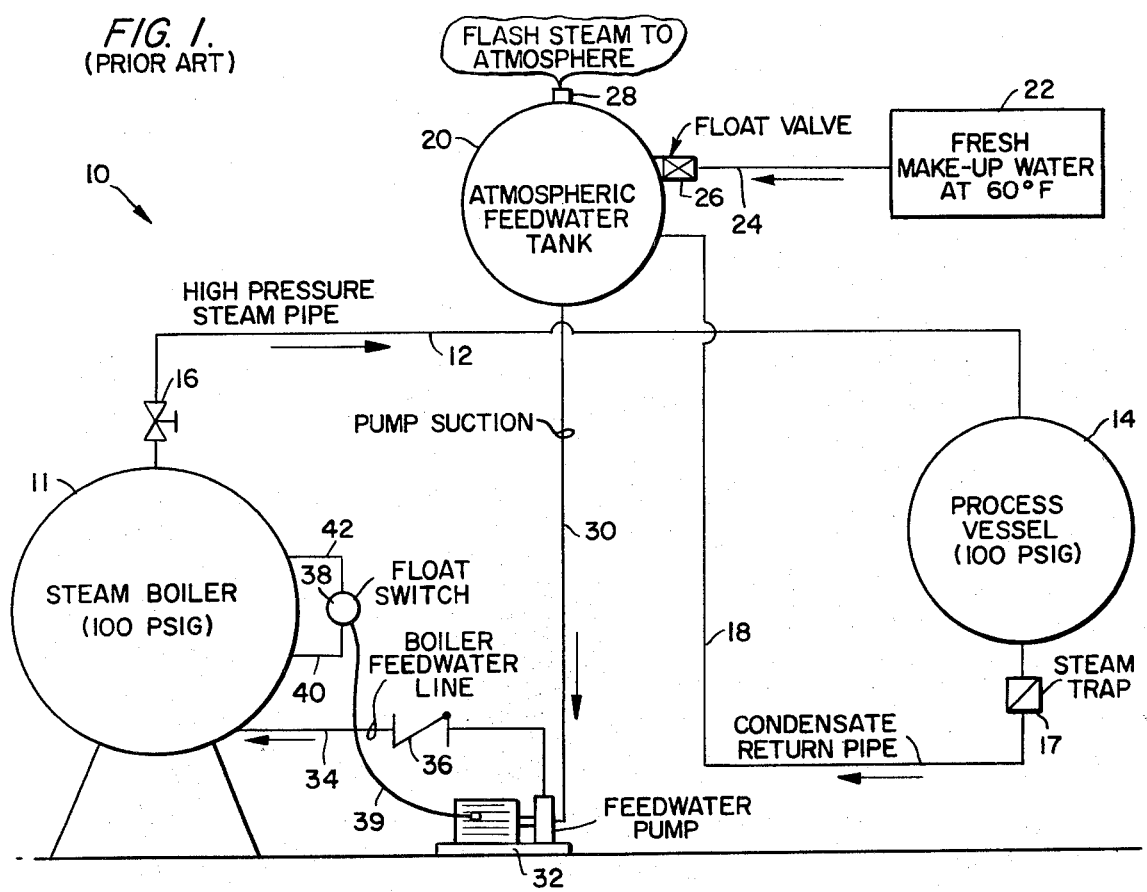
FIG. 1 is a block diagram of a typical and conventional condensate return system in a steam generation and utilization system.

In FIG. 1, a schematic block diagram is provided to show a typical conventional condensate return system, designated generally by the reference numeral 10, in a steam utilization process. The system 10 includes a steam boiler 11 for providing steam at a suitable high pressure such as 100 PSIG through a high pressure steam line 12 to a process vessel 14. The flow of high pressure steam through the high pressure steam pipe 12 may be controlled by a control valve 16. The process vessel 14 effectively utilizes the steam heat in an industrial process in a manner which generates residual steam condensate. The remaining steam and condensate are passed through a steam trap 17 via a condensate return line 18 to a feedwater tank or receiver 20, for example, operating at atmospheric pressure, to be combined with fresh make-up water. In general, such systems provide for the return of condensate from the vessel 14 through the steam trap 17 in line 18 by the use of steam pressure to force the condensate to the feedwater tank 20 which acts as an atmospheric or low pressure receiver. The term "low pressure condensate" applies to the condensate existing after flashing of the high pressure condensate in the condensate return line 18 to a lower pressure which may be atmospheric pressure, for the system shown, or some low pressure above atmospheric pressure. The feedwater tank 20 acts as a collection point, surge point, feedwater make-up tank, and point of removal of air and non-condensible gases from the condensate.

Make-up water is provided from a source 22 at an ambient temperature such as 60° F. through a make-up water feedline 24. The flow of make-up water to the feedwater tank 20 is controlled by a float valve 26 to maintain a suitable desired level of feedwater to the tank.

In such a system, which returns the condensate from the process vessel 14 to the receiver 20, a significant amount of vapor is flashed through the receiver vent pipe 28 as the condensate is cooled from the saturated steam temperature at a suitable high pressure to its saturation temperature at the receiver pressure. In many cases, the condensate is cooled to 212° F. as in the case when the receiver is at atmospheric pressure. For the system shown, to maintain a relatively constant volume of feedwater in the system, the make-up water at ambient temperatures is periodically added to replace the volume flashed to the atmosphere.

It is a significant shortcoming of the system shown in FIG. 1 that the make-up water plus the remaining condensate must be heated to the saturation temperature inside the boiler 11 before steam can be regenerated through line 12 to the process vessel 14. In addition, significant losses are incurred in pumping costs because the condensate exiting on the line 30 from the receiver 20 is provided by the suction created by the feedwater pump 32 through the feedwater supply line 34 to the steam boiler. A check valve 36 is provided in the boiler feedwater line 34 to prevent backflow of the condensate in the system.

In a typical installation, a float switch 38 is provided to control on an intermittent or as-needed basis the operation of the feedwater pump 32 by a signal on line 39 to maintain the feedwater supply in the boiler between predetermined limits suggested by the positioning of the leads 40 and 42 and an accompanying float within the boiler. Those pumping costs are incurred in part because the condensate from the receiver 20 must be raised from an atmospheric or low pressure back to the boiler pressure by the feedwater pump 32. In addition, the inefficiency of the pump in overcoming the friction losses in pumping is wasted.

Figure 2:
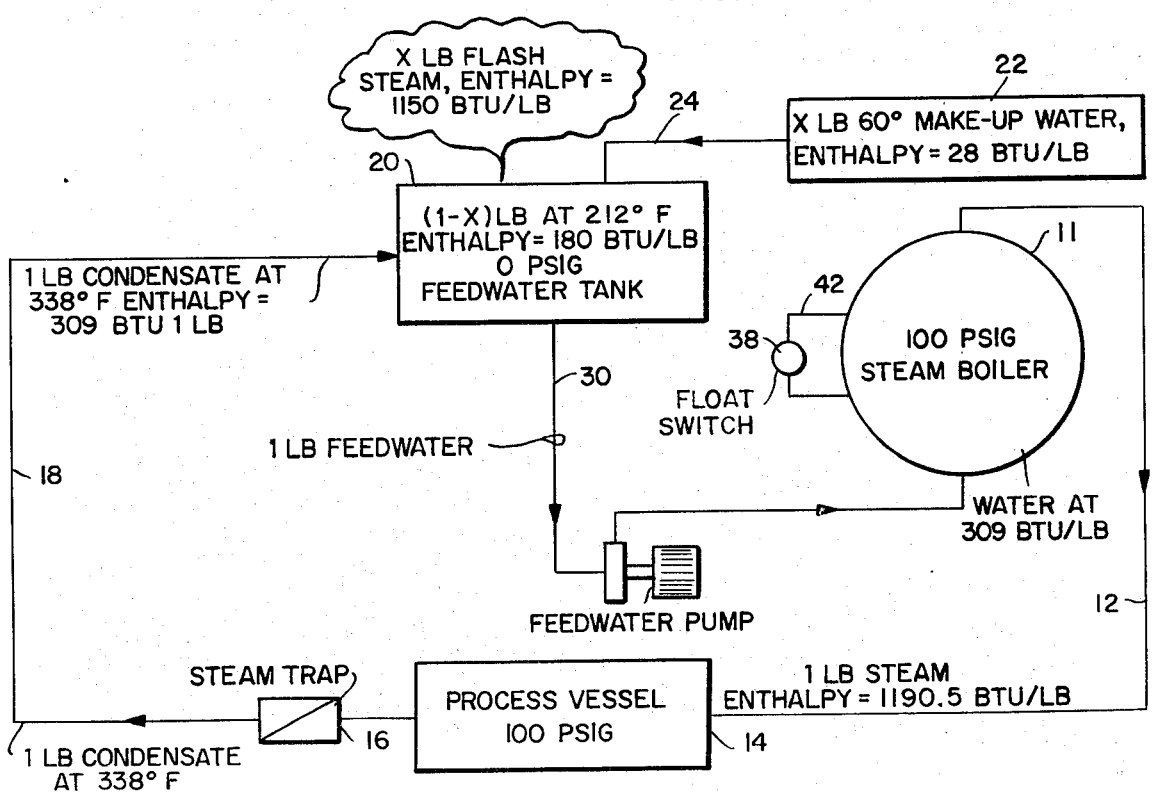
FIG. 2 is a block diagram depicting the heat balance in the system of FIG. 1 to illustrate the amount of energy wasted by flashing the condensate to steam, as in a conventional system such as that shown in FIG. 1.

FIG. 2 is a diagram suitable for understanding the calculation of losses in a conventional system such as that shown in FIG. 1 wherein like references are utilized to identify like elements. On a unit analysis basis, the steam boiler 11 provides a pound of steam having an enthalpy of 1190.5 BTU/lb. on line 12 at 100 Psig to the process vessel 14. The efficient use of that pound of steam by the process vessel will produce at the output of the steam trap 17 a pound of condensate at about 338° F. and having an enthalpy of 309 BTU/lb. At the receiver 20, a certain amount X of this condensate will flash to steam having an enthalpy of 1150 BTU/lb. and the remaining condensate of (1-X) lbs. at 212° F. and 0 Psi will have an enthalpy of 180 pounds. Thus, X pounds of make-up water, for example at 60° F. having an enthalpy of 28 BTU/lb. will be provided so that the output of the feedwater tank will be one pound of feedwater having an enthalpy of 309 BTU/lb. per pound to the boiler 11. The flash steam loss is given by the following relationship:

$$(X \text{ lbs}) (1150 \text{ BTU/lb.}) + (1 - X) \text{ lbs} \cdot (180 \text{ BTU/lb.}) = 309 \text{ BTU/lbs} \cdot \text{lb.} \quad (1)$$
$$970X = 129$$
$$X = \frac{129}{970}$$
$$X = .133 \text{ lb.}$$

The actual energy wasted for each pound of steam generated due to flashing condensate to the atmosphere will be given by the relationship as follows:

$$(1 - .133 \text{ lb.}) \cdot (309 \text{ BTU/lb.} - 180 \text{ BTU/lb.}) + \quad (2)$$
$$(.133 \text{ lb.}) \cdot (309 \text{ BTU/lb.} - 28 \text{ BTU/lb.}) = L$$
$$(.867 \text{ lb.} \cdot 129 \text{ BTU/lb.}) + (.133 \text{ lb.} \cdot 281 \text{ BTU/lb.}) = L$$
$$L = 149 \text{ BTU}$$

FIG. 3 shows a typical high pressure condensate return system designated generally by the reference numeral 43 which seeks to minimize or eliminate the losses described above. The high temperature and pressure condensate from the process vessel 14 is provided through a condensate return pipe 18 to a condensate return unit 44. The unit 44 operates in a manner which depresses the temperature and the pressure of the condensate in order to pump the condensate by a condensate pump 46 to the boiler on the condensate return line 48. The requirement for throttling the pump discharge for control results from a desire to avoid the requirement to cycle the condensate pump, but may result in undue wear of seals, impellers, and bearings. Preferably, the condensate line 48 is connected to the boiler feedwater line 34 on the downstream side of the check valve 36. In addition, the unit 44 provides a limited capability for removal of air and other non-condensible gases to a flash steam bleed line 50 having a control valve 52 therein for flashing a small amount of condensate from a very small surface area in the unit 44. In such a system, some of the condensate is flashed to carry away the non-condensibles and/or to increase the suction on the pump 46. In the alternative, the suction head on the pump 46 may be increased by utilizing a heat exchanger in the line 50 to provide some heat loss to the atmosphere. In addition, the output of the condensate pump is controlled by a level controller 54 on the unit 44 controlling a control valve 56 thus to control the condensate pumped by the pump 46 to the boiler 11. Whether there is a flashing to steam, a throttling of the pump output, intermittent operation of the pump, or an intentional heat exchange to atmosphere, the net result is a loss of efficiency and energy which might otherwise be conserved.

A system incorporating the apparatus of the invention in the form of a high pressure condensate return unit 60 is shown in FIG. 4 and provides a significant improvement in solving the problems heretofore present with high pressure systems of the type shown in FIG. 3. As will be discussed, the system of FIG. 4 is designed to return the condensate from the unit 60 through a check valve 62 on the condensate return line 64 through the boiler feed valve 66 directly to the boiler, bypassing the feedwater system in such a way that there is no need for the release of vapors as in the system of FIG. 3 at any point. In addition, the unit 60 operates so that there is no throttling of the pump suction or discharge while continuing to provide adequate provisions for deaeration of the non-condensible gases from the process vessel. In addition, there are no elaborate controls necessary to gain the advantages of avoiding the release of vapors and avoiding the throttling of the pump suction or discharge.

Preferably, the normal water level in the boiler is controlled by the switch 38 as described in connection with FIGS. 1 and 3, while the new water level in the steam boiler is controlled by the switch 63. The switch 63 is connected to leads 65 and 67 establishing ranges in the boiler to provide a signal on lead 61 to the boiler feed valve 66.

Figure 5:
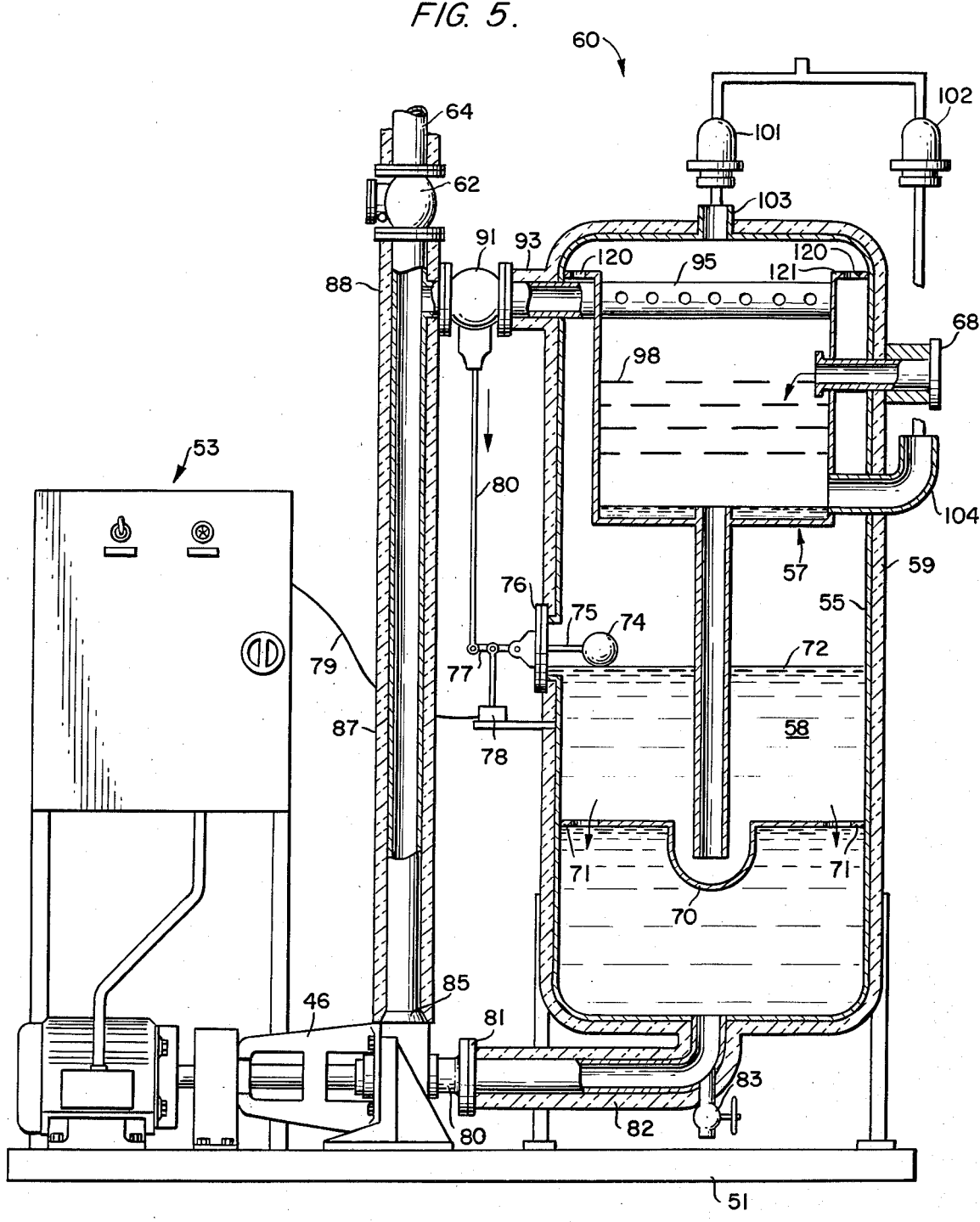
FIG. 5 is a cross-sectional view of the apparatus according to the invention.

The apparatus according to the invention is shown in FIG. 5. As shown in FIG. 5, the high pressure condensate return unit as utilized in the system of FIG. 4, is designated generally by the reference numeral 60. The unit comprises a unitary shell 55 defining a vessel, the upper portion of which receives a deaeration apparatus, designated generally by the reference numeral 57, and the lower portion of which acts as a receiver 58 to receive condensate from the process vessel on line 18. The unit 60 is insulated as at 59 to prevent heat loss from the condensate. The unit 60 is preferably mounted on a base 51 together with its associated controls, designated generally by the reference numeral 53. A partitioning member 70 having openings 71 therein is located in the receiver 58 within the vessel.

Condensate from the process vessel 11 in line 18 is provided to the vessel 55 through a flanged inlet 68, by the action of gravity and preferably without an intervening steam trap on line 18 between the vessel 14 and the unit 60. The condensate thus is drained by gravity from the process vessel to the deaerator portion 57 of the vessel 55 of the unit 60. The condensate in the receiver 58, the upper level of which is designated by the reference numeral 72, is at saturation at the same pressure and temperature as the steam in the process vessel 11, shown in FIG. 4. As explained, preferably no steam traps are used between the process vessel 11 and the receiver 58. As condensate collects in the receiver 58, the condensate level 72 rises to the level of the float 74 having a float arm 75 passing through an opening in a wall of the vessel 55 closed by a float cap 76. The float arm 75 actuates the lever arm 77 which lowers as the float 74 rises actuating the switch 78. The switch 78 is connected by leads 79 to the condensate pump 46 (FIG. 4) to pump condensate from the suction line of the pump 46 which is connected by flanges 81 to the condensate outlet portion 82 of the vessel 55. The switch 78 is spring loaded to prevent shutting the pump 46 off prior to establishing that operating level in the receiver. A drain valve 83 is provided for draining the unit 60 for cleaning or repair. The outlet 85 or discharge side of the pump 46 is connected by a conduit 87 to the level designated by the reference numeral 88.

The outlet conduit 87 is connected to the check valve 62 (see FIG. 4) and to a throttle valve 91. The valve 91 is a proportioning valve which is operated by the lever 77 connected to an extension member 80 to actuate the throttle valve 91. The throttle valve 91 is sized such that the pressure drop across the valve is less than the back pressure on the system between the pump 46 and the boiler 11. Therefore, when the valve 91 is fully open, the hot condensate will recirculate into the vessel 55 rather than discharge to the boiler 11.

Under such conditions, the hot condensate leaves the valve 91 and is provided to a flanged condensate-receiving opening 93 in the process vessel 55 to enter the deaeration apparatus 57.

The deaeration apparatus 57 includes a perforated conduit 95 having a plurality of openings 96 therein for effectively spraying the hot condensate within the conduit 95 as received through the inlet 93 from the valve 91 onto a plurality of perforated trays 98 thereby exposing substantially more surface area of the condensate to the inside of the unit 60. Because the condensate within the unit 60 is at saturation conditions, air and other non-condensible gases are separated from the liquid within the unit.

The air and other non-condensible gases thus liberated from the condensate in the upper portion of the apparatus 60 are exhausted through a pair of automatic thermostatic air vents 101 and 102. The air vent 101 is connected at one side thereof to an outlet 103 on the upper surface of the vessel 55 while the air vent 102 is connected to an elbow 104 protruding through another vent opening in the vessel 55 at a side thereof. The other side of the elbow 104 is in communication with the lower portion of the deaeration apparatus 57 to remove heavier non-condensible gases.

While a tray-type deaerator is shown and described in connection with FIG. 5, other types of deaerators, such as spray-type deaerators, could also be used in connection with the vessel 55 to deaerate incoming and/or recirculated condensate.

At a predetermined level of the surface 72 of the condensate, as ascertained by the position of the float 74, within the receiver portion 58 of the vessel 55, the throttle valve 91 will throttle to a point such that the pressure at the level of the outlet of the valve 91 (or the position 88) is high enough to sustain flow through the check valve 62 through the conduit 64 constituting the condensate feedline to the steam boiler, also shown in FIG. 4. The pressure thus described is the equilibrium pressure within the receiver. Thus, it is an advantage that the system will automatically adjust its output to the boiler 11 whenever there is any change in the flow of condensate entering the receiver 58. The pump controls 53 are interlocked with the process equipment so that the pump 46 will shut off when this equipment is shut off.

The unit as described in connection with FIG. 5 is designed for use with process equipment which drains by gravity. As shown, the inlet 68 is preferably at a level above the trays 98 of the deaerator 57 in the upper portion of the vessel 55 so that the inlet is deaerated prior to flowing to the receiver. Alternatively, the return unit 60 can also be used with equipment which removes condensate from the process vessel by a syphon or which is physically installed so as to prevent gravity drainage. In such a case, the unit will be modified by replacing one of the two air vent valves 101, 102 with a self-actuated differential pressure regulator or a constant vent valve to maintain a pressure in the receiver slightly lower than that in the process vessel 14. When a self-actuated differential pressure regulator is used, it acts to monitor and adjust for changes in the pressure in the process vessel and maintain a constant pressure differential between the process vessel and the receiver. The water seal provided by the condensate in the syphon, or an external water seal trap, prevents loss of steam in the vessel 55 from the process vessel 14 itself. Openings 120 are provided in the flange 121 connecting the deaerator 57 to the vessel 55 to permit air above the condensate to exit to the vent 101.

Thus, an improved high pressure condensate return unit and system for the use of such unit and the method of using such unit have been described. Such units have significant advantages in that they are operated without temperature or pressure depression and the system is controlled without a throttling of the discharge or suction of the pump. Moreover, there is an automatic proportional control of the system by virtue of its operation of parts and design without the necessity of automatic proportional equipment. Such proportional control results in and from inherent self-balancing aspects of the system as described.

The return unit 60 of FIG. 5 is additionally advantageous in that it is capable of using pump energy for other purposes, such as agitating the condensate being pumped, or conversely, conserving such energy, which pump energy is normally wasted to operate a specific deaeration device while the apparatus 60 of FIG. 5 is substantially self-deaerating. In addition, the deaeration design operates to deaerate the condensate without constantly or even intermittently venting off flash steam. This permits the use of pump energy to provide deaeration. In practice, there are virtually no heat losses in the use of the apparatus of FIG. 5; the insulation 59 being such that an insignificant amount of heat will be lost. Furthermore, the return unit 60 of FIG. 5 inherently acts as a surge unit for receiving condensate.

The valve 91 may be replaced by a three-way diverting valve which modulates the condensate flow as described in connection with FIG. 5 and valve 91. The inlet to the diverting valve is connected to the conduit 87, one of its outputs to the conduit 64, and the other outlet is connected to the inlet 93 of the vessel. Its modulating and diverting functions act in response to the movement of the lever 80 or, in the alternative, to an electrical or pneumatic or hydraulic signal representing the position of the float 74.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A high pressure condensate return apparatus for use in a steam utilization process, comprising:
    a vessel, which includes an inlet for receiving condensate from said process at a temperature and pressure about the same as in said process, said vessel defining a condensate zone in communication with a condensate outlet of said vessel, and a deaeration zone;
    deaeration means in said deaeration zone of said vessel for separating non-condensible gases from the liquid condensate;
    circulation means for circulating condensate from said condensate zone to said deaeration means in said deaeration zone, said circulation means including a pump having its suction end connected to the condensate outlet of said vessel and its discharge side connected to a conduit having an outlet for connection to a steam boiler in said process;
    a modulating valve connected to said conduit, said valve acting when open to recirculate condensate from the condensate outlet to the deaeration zone of the vessel, and acting when closed to cause said condensate to be returned to the steam boiler;
    level sensing means for sensing the level of condensate in said vessel for actuating said valve in response thereto in a predetermined manner; and
    vent means for venting said non-condensible gases separated from the condensate in said deaeration zone to the exterior of said vessel.

2. The apparatus as set forth in claim 1, wherein said level sensing means and said valve cooperate so that said valve is more open when the condensate level in said vessel is low to recirculate the condensate into the vessel and to modulate the valve as the condensate level rises to increase the pressure at a predetermined position in said conduit relative to the back pressure therein until said pressure is sufficient to sustain condensate flow to the steam boiler, the sufficient pressure being the equilibrium pressure within the vessel, whereby the output of condensate from the vessel to the steam boiler is automatically compensated.

3. The apparatus of claim 1 or 2, wherein said level sensing means includes a float at about the surface of the condensate within the vessel, and a lever connected to said float and to said valve for actuating said valve in response to the condensate level.

4. The apparatus as set forth in claim 3, wherein said lever is connected to a switch which operates the pump in response to a predetermined level of condensate in said vessel.

5. The apparatus as set forth in claim 1 or 2, wherein said deaeration means comprises a deaeration apparatus located in the deaeration zone of the vessel, the deaeration apparatus including a plurality of perforated trays to disperse condensate received thereat from said valve into a plurality of smaller streams thereby to expose more surface area of said condensate.

6. The apparatus as set forth in claim 5, wherein said vent means includes a thermostatic air vent for exhausting non-condensible gases separated from said condensate from said vessel without flashing said condensate to the atmosphere.

7. The apparatus as set forth in claim 1 or 2 in combination with a high pressure steam utilization system of the type which includes a steam boiler for providing steam at a high pressure to a process vessel which produces steam condensate, the outlet of the process vessel connected directly to the inlet of said vessel, the outlet of said conduit on the downstream side of said valve being directly connected to the inlet to the boiler.

8. The apparatus as set forth in claim 1 wherein said modulating valve has a pressure drop across the valve which is less than the back pressure between the steam boiler and the pump.

9. The apparatus as set forth in claim 1 wherein said modulating valve is a three-way diverting valve having an inlet connected to the condensate outlet of the vessel, a first outlet connected to the steam boiler, and a second outlet connected to the deaeration zone of said vessel.

10. In an apparatus of the type comprising a vessel having an inlet receiving condensate from a steam process vessel at a high temperature and pressure and having a condensate receiver and a deaerator, therein, with means for venting gases separated from the condensate in the deaerator, and a pump for discharging condensate from said vessel to a steam boiler, the improvement comprising:
   a modulating valve in fluid circuit with the inlet and the outlet of said vessel for controlling a recirculating flow of condensate therebetween and to said boiler in response to the level of condensate in said vessel, so that when the condensate level is higher, a larger amount of condensate is supplied to said boiler, whereby the rate of supply of condensate to said boiler approximates the rate of flow of said condensate to said vessel from said process vessel.

11. The apparatus as set forth in claim 10, further including means for constantly operating said pump at normal speed for all levels of condensate above a predetermined level to recirculate all or a portion of the condensate through said deaerator.

12. The apparatus as set forth in claim 11, further including means for modulating said valve between fully open and fully closed for levels of condensate within said receiver between a low predetermined level and an upper predetermined level.

13. The improvement as set forth in claim 10 further including level sensing means for sensing the condensate level within the vessel and providing a condensate level sensing signal responsive thereto.

14. The apparatus as set forth in claim 13, further including means responsive to said condensate level signal for controlling said valve in a way that said valve is fully open at a low condensate level, whereby condensate is recirculated to said vessel and fully closed at another higher level whereby the condensate is provided to said boiler and is partially open for levels between said low and said high levels to an extent which causes condensate to be provided to the boiler at a rate approximately equal to the rate condensate is provided to said apparatus.

15. The apparatus as set forth in claim 10 wherein said modulating valve is further characterized as having a pressure drop across the valve which is less than the back pressure between the steam boiler and the pump.

16. The apparatus as set forth in claim 10 wherein said modulating valve is a three-way diverting valve having an inlet connected to the condensate outlet of the vessel, a first outlet connected to the steam boiler, and a second outlet connected to the deaeration zone of said vessel.

17. In a process for generating high pressure steam in a steam boiler and providing said high pressure steam to a process vessel whereby condensate is formed, and providing said condensate to a high pressure condensate return vessel which includes a condensate return pump, wherein at least a portion of said condensate is deaerated to separate non-condensible gases from said condensate, the improvement comprising the steps of:
   deaerating the condensate provided to the inlet of the condensate return vessel, and
   proportioning the relative rates of flow of condensate transmitted to said boiler and recirculated to said unit from the outlet of the steam condensate return vessel in response to the level of condensate within said vessel by a modulating valve connected between a condensate outlet of a vessel and a recirculating input of the vessel without flashing said condensate to steam and while continuously operating said pump at normal speed.

18. The method as set forth in claim 17, wherein the step of controlling further includes the step of continuously modulating a valve between a fully open position and a fully closed position whereby when fully open, all of the condensate pumped from the outlet of said vessel is recirculated to said vessel and when fully closed, all of the condensate is transmitted to said boiler.

19. The method as set forth in claim 17 or 18 further including the step of sensing the condensate level to provide said output representative of said level to said valve.

20. The method as set forth in claim 17 wherein the step of proportioning is carried out using a modulating valve having a pressure drop across the valve which is less than the back pressure between the steam boiler and the pump.

21. The method as set forth in claim 17 wherein the step of proportioning is carried out using a three-way diverting valve.

* * * * *